United States Patent
Parker et al.

(10) Patent No.: US 9,402,042 B2
(45) Date of Patent: Jul. 26, 2016

(54) TIME DELAY AND INTEGRATION SCANNING USING A CCD IMAGER

(71) Applicant: Thorlabs, Inc., Newton, NJ (US)

(72) Inventors: Martin Parker, Austin, TX (US); Jason Mills, Austin, TX (US); Ash Prabala, Austin, TX (US); Frank Armstrong, Rochester, NY (US); Jeffrey Erickson, Cedar Park, TX (US); Gregory Havenga, Austin, TX (US); Charles Taylor, Johnson City, TX (US); William Ratdke, Ellicott City, MD (US)

(73) Assignee: Thorlabs, Inc., Newton, NJ (US)

(*) Notice: Subject to any disclaimer, the term of this patent is extended or adjusted under 35 U.S.C. 154(b) by 255 days.

(21) Appl. No.: 14/052,251

(22) Filed: Oct. 11, 2013

(65) Prior Publication Data

US 2014/0104468 A1    Apr. 17, 2014

Related U.S. Application Data

(60) Provisional application No. 61/713,474, filed on Oct. 12, 2012.

(51) Int. Cl.
*H04N 5/372*    (2011.01)
*H04N 5/353*    (2011.01)

(52) U.S. Cl.
CPC ........... *H04N 5/37213* (2013.01); *H04N 5/353* (2013.01); *H04N 5/37206* (2013.01)

(58) Field of Classification Search
CPC .............. H04N 5/37213; H04N 5/353; H04N 5/37206; H04N 5/3575; H04N 5/374; H04N 5/37455; H04N 5/378
See application file for complete search history.

(56) References Cited

U.S. PATENT DOCUMENTS

| | | | | |
|---|---|---|---|---|
| 5,668,887 | A * | 9/1997 | Parker | G01N 21/8422 348/E3.023 |
| 5,828,408 | A * | 10/1998 | Mottin | H04N 5/37206 348/295 |
| 6,507,417 | B1 * | 1/2003 | Makihira | G06T 7/0004 357/486 |
| 6,933,975 | B2 * | 8/2005 | Wen | H04N 5/335 348/295 |
| 7,009,163 | B2 * | 3/2006 | Katzir | G01N 21/8851 250/208.1 |
| 7,268,814 | B1 * | 9/2007 | Pain | H04N 5/3575 348/294 |
| 7,675,561 | B2 * | 3/2010 | Lepage | H04N 3/1525 348/241 |

(Continued)

FOREIGN PATENT DOCUMENTS

DE  10108385 A1  9/2001
EP  0624988 A1  11/1994

(Continued)

OTHER PUBLICATIONS

International Search Report mailed Jan. 30, 2014 in corresponding International Application No. PCT/US2013/064612.

(Continued)

*Primary Examiner* — Aung S Moe
(74) *Attorney, Agent, or Firm* — Graham Curtin, P.A.

(57) ABSTRACT

A method for operating a focal plane array in a Time Delay Integration (TDI) mode, the method including: shifting a number of rows during TDI integration, wherein the number of rows shifted is less than a total number of rows of the focal plane array; and reading out a number of rows equal to the total number of rows of the focal plane array minus the number of rows shifted, leaving behind the partially-integrated rows.

19 Claims, 13 Drawing Sheets

(56) References Cited

U.S. PATENT DOCUMENTS

| | | |
|---|---|---|
| 8,094,902 B2 | 1/2012 | Crandall et al. |
| 8,451,354 B2* | 5/2013 | Cazaux ............... H04N 5/3743 348/295 |
| 2001/0021244 A1 | 9/2001 | Suzuki et al. |
| 2004/0170312 A1 | 9/2004 | Soenksen |
| 2009/0238446 A1* | 9/2009 | Kataoka .................... G03F 1/84 382/152 |
| 2010/0046853 A1* | 2/2010 | Goodnough ....... H04N 5/37206 382/275 |
| 2010/0260409 A1* | 10/2010 | Ben-Levy .......... G01B 11/2518 382/141 |
| 2011/0317052 A1* | 12/2011 | Kieft .................... G01J 3/2803 348/295 |
| 2012/0006971 A1 | 1/2012 | Pflibsen et al. |
| 2015/0124119 A1* | 5/2015 | Gossage ............ H04N 5/37206 348/230.1 |

FOREIGN PATENT DOCUMENTS

| | | |
|---|---|---|
| EP | 0859509 A2 | 8/1998 |
| EP | 2088763 A2 | 8/2009 |
| JP | 07162767 | 6/1995 |
| JP | 2004514920 A | 5/2004 |
| JP | 2006259377 A | 9/2006 |
| RU | 2403593 C1 | 11/2010 |
| WO | 0184209 A2 | 11/2001 |

OTHER PUBLICATIONS

Japanese Office Action entitled "Notice of Reasons for Rejection", dated Jun. 14, 2016 from the Japanese Patent Office for corresponding Japan Application No. 2015-536954 and English translation.
Partial Supplementary European Search Report dated Apr. 28, 2016 from the European Patent Office for corresponding European Application No. 13846050.6.

* cited by examiner

TIME DELAY AND INTEGRATION SCANNING USING A CCD IMAGER

CROSS-REFERENCE TO RELATED APPLICATIONS

This application claims the benefit of U.S. Provisional Application No. 61/713,474 filed on Oct. 12, 2012, the contents of which are herein incorporated by reference.

FIELD OF THE INVENTION

The present invention relates to the field of image scanning, and more particularly to time delay and integration (TDI) scanning using a CCD imager.

BACKGROUND

An interline CCD imager can be operated in a TDI mode, as defined, for example, in U.S. Pat. No. 4,922,337, allowing exposure of moving objects without stopping motion, as in a conventional TDI camera, while enabling conventional live video or long exposure of a still object, which is not practical in a conventional TDI camera. Thus, for example, high-speed scanning of a large area can be achieved with continuous motion and then followed by a return to a very small, highly magnified, still region of interest with the same camera and device.

When an interline CCD is operated in TDI mode for a number of TDI transfers, N, that is less than the total number of rows, TOTAL_ROWS, at completion there will be N trailing rows that are only partially exposed. During readout, the entire TOTAL_ROWS rows are transferred out, resulting in a readout time for TOTAL_ROWS rows but a usable image of only TOTAL_ROWS-N rows. Thus, the time to read out and discard the N rows is wasted time, slowing down the TDI scanning process.

In most scanning applications, more rapid image acquisition for a given exposure time is desirable.

A TDI system using an interline system was developed by DVC Company for an OEM customer. However, it did not attempt to trim the N partially exposed rows, and the entire TDI shift sequence was controlled by an internal timebase. TDI shifts are not individually responsive to an external control signal and therefore unable to be controlled precisely in response to subject motion.

Another TDI system, the Hamamatsu Orca R2 with TDI option, does not permit TDI followed by readout as described above. The product only permits a continuous TDI, where the charge is transported across the entire length of the CCD array (the entire number of rows, where TOTAL_ROWS equals approximately 1040). This method avoids the problem of the N partially exposed rows, since all rows are exposed and read in a continuous fashion. However, the scheme suffers significant limitations, including a relatively long minimum exposure of approximately 120 ms and a fixed, very large number of TDI transfers.

SUMMARY

It was recognized that for each partially exposed trailing row generated from a given TDI transfer, a corresponding empty row was simultaneously clocked out of the other end of the device, analogous to a conveyer belt. With the prior art clocking out of underexposed pixels increases readout time therefore increasing the time to scan a given area. The proposed method solves this problem by reading out (clocking) only the TOTAL_ROWS-N valid rows, the N partially-exposed rows are moved from the trailing side to the leading side, or readout side of the device, next in line to be transferred out. By stopping readout at that point, readout time is decreased, allowing faster advance to the next field of view to be scanned. When TDI sequences resume, the partially exposed rows are now clocked out of the device simultaneously with the advance of the TDI transfers. In this manner, the required discarding of the invalid rows is achieved while reducing the time the time to read out the valid.

An embodiment of the invention provides a method to operate a CCD sensor to achieve synchronized Time Delay Integration (TDI) scanning followed by a partial interline charge transfer readout sequence that leaves the unavoidable, partially integrated trailing rows from the beginning of the N TDI transfers behind in the interline CCD registers. The partially integrated trailing rows left in the device are then the discarded as leading rows in the following TDI integration sequence. By eliminating the readout of these partially integrated rows in a series of TDI exposures, readout time is decreased, allowing a corresponding increase in scanning speed for a given exposure. An alternative method is to resume the TDI sequence on the partially integrated rows after readout of the valid rows, recovering the partially integrated rows and preserving the full native resolution of the CCD sensor.

DETAILED DESCRIPTION OF THE PREFERRED EMBODIMENTS

Figure 1:
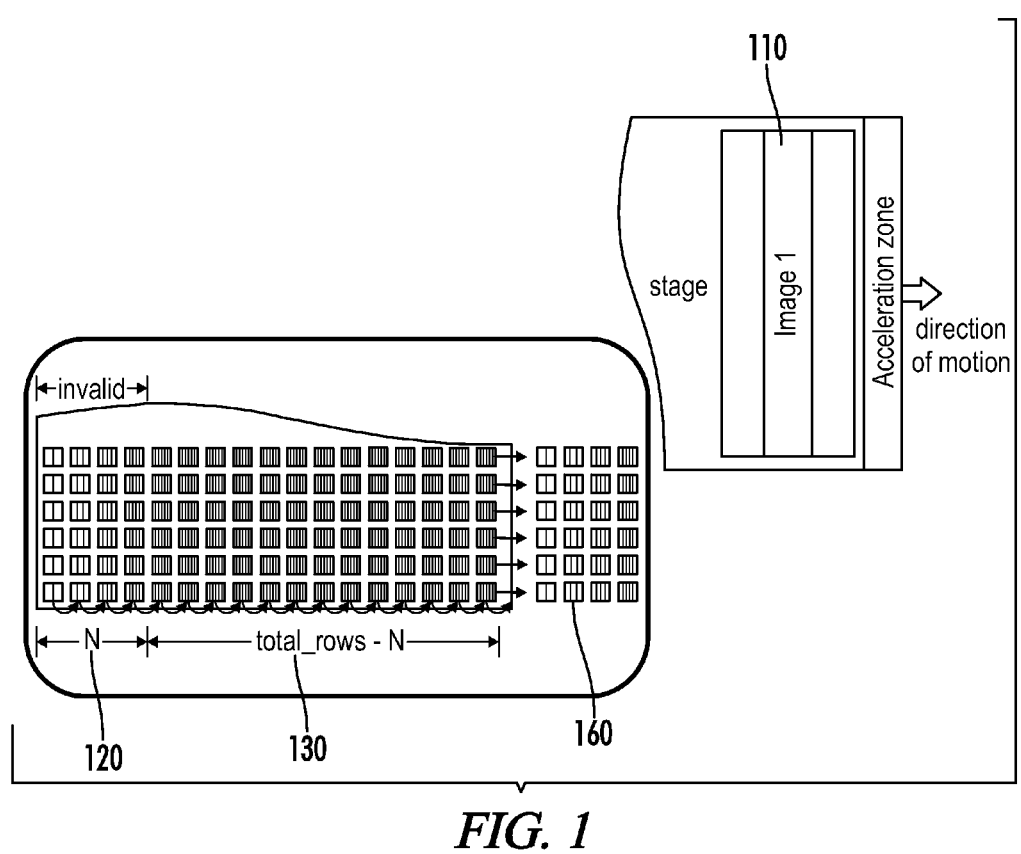
FIG. 1 illustrates the first of a sequence of images of a moving stage using interline TDI according to an embodiment of the invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

TDI (Time Delay and Integration a.k.a Time Delay Integration) is a method of moving charge along a CCD register in response to an external signal in order to follow the motion of an image on the focal plane and therefore integrate charge gradually during the relative motion—providing the image is moving exactly parallel to shift register. This method allows longer exposure times for continuous motion than would be possible with a 2-dimensional snapshot, as the latter requires a very short exposure to "freeze" motion and avoid motion blur in the image.

Dedicated TDI CCD devices are generally linear CCDs with a relatively small (32 to 128 row) frame transfer vertical CCD array for the motion tracking. The charge is integrated in the vertical CCD, shifting along as commanded by the control system, with a horizontal readout between each shift. Being a linear CCD, a 2-D image can only be produced if there is motion.

The interline TDI described herein is a variant of the classic TDI approach for an interline transfer device. In this method, charge is transferred from the photodiode array into the storage area (also known as the vertical CCD or VCCD) and then shifted one or more rows in response to an external signal, analogous to the shifting of charge in the frame transfer TDI sensor. As this process is repeated, charge is accumulated by these successive transfers and shifts. One major benefit of the interline TDI is that a 2-D image can be produced with a still subject and the device can be switched back and forth between TDI and conventional video or snapshot modes.

There are two basic stages in the interline transfer TDI process; integration and readout. The integration stage comprises the series of transfers and shifts, which is followed by the normal readout. This is an important concept because, unlike conventional TDI, there is not a continuous readout of lines that generate a continuous image "strip" except for the limiting case where the number of shifts equals the number of rows, and then the timing can change to a strip mode. That case will be discussed later in this document. Rather, the TDI process results in a series of 2-dimensional images whose timing must be controlled such that they can be stitched together to form the desired whole. The process of generating one image is illustrated in the context of a moving stage in FIG. 1 (photodiode-to-VCCD transfers are not shown for simplicity). FIG. 1 illustrates the first of a sequence of images 110 of a moving stage using interline TDI. During the TDI integration, charge follows the stage movement for N transfers, accumulating (integrating) along the way. Each transfer followed by one or more shifts is triggered by a pulse form a stage encoder, causing the accumulated charge to follow the projection of the stage travel on the focal plane array. FIG. 1. Shows the result after N transfers. There are (total-rows-N) valid rows 130 ready for readout. There are also N invalid rows 120 having partial integration. FIG. 1 also shows the invalid, partially integrated rows 160 from previous frame. These partially integrated rows 160 are discarded as the new frame is integrated.

Figure 2:
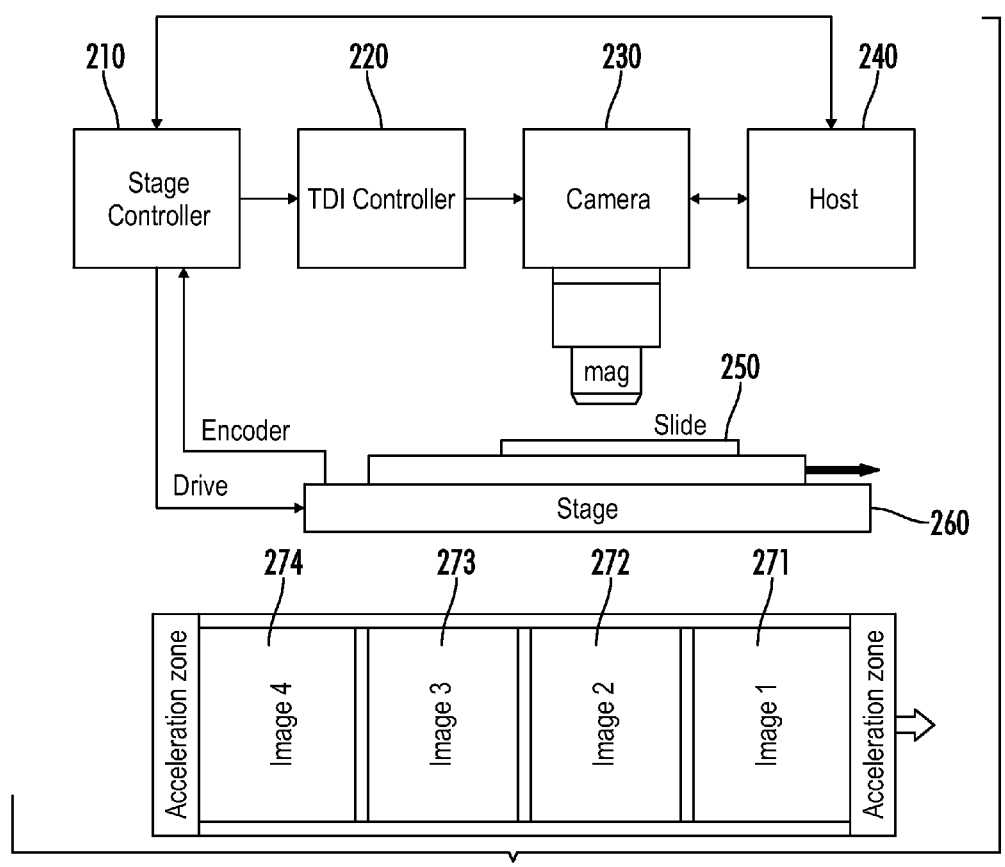
FIG. 2 shows a block diagram of the system and illustrates successive captures of a moving stage as projected onto the stage according to an embodiment of the invention.

To build a complete montage of images, a series of such images are exposed sequentially as the stage moves. Though the exposure and readout phases are discrete and sequential, adjacent images of the subject can be captured with the desired spatial registration (e.g. slight overlap) by controlling the system. In other words, the readout process does interrupt exposure, however, TDI (exposure) occurs on a fraction of the movement from one field to another depending on the number of TDI shifts, N. For a megapixel imager, N can be much lower than the total number of rows in the device. For example, 100 shifts in 1000 rows. Once an exposure is complete, the stage continues to move the current field out of view while simultaneously only the leading, valid total_rows-N rows of the CCD are being read out. The N trailing rows are now moved to the readout side of the CCD and the readout of the valid rows is complete. The velocity of the subject is controlled such that the new field is at that point almost completely into the field of view of the CCD. Once the exact position of the beginning of the new frame is reached (which may or may not include deliberate overlap depending on the system needs), the sequence repeats. This process is illustrated in FIG. 2 which also shows successive captures 271, 272, 273, 274 of a moving stages as projected onto the stage.

Figure 3:
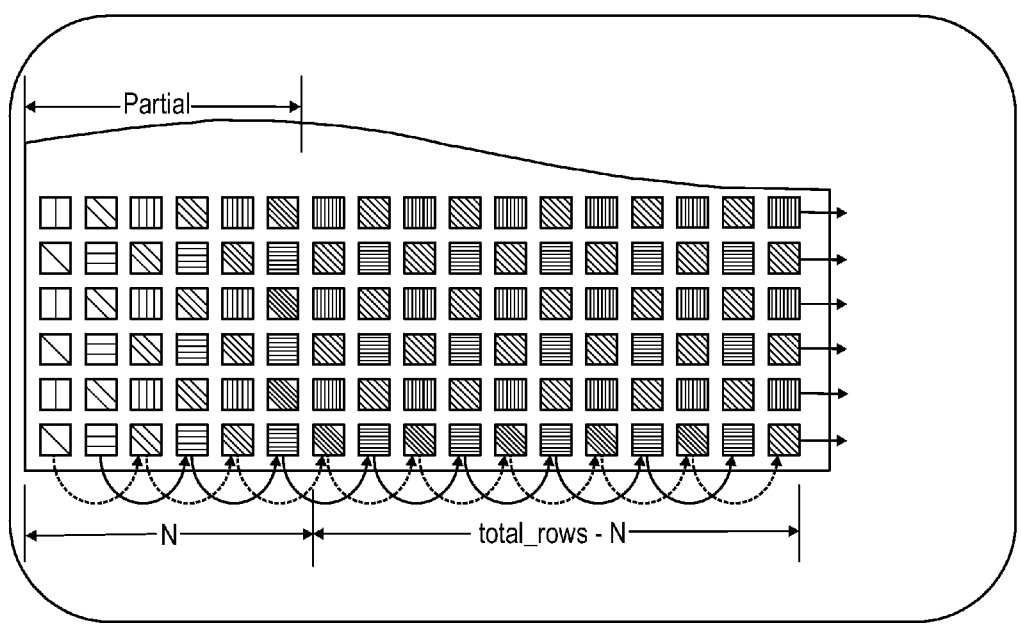
FIG. 3 shows a Bayer color array in a embodiment of the invention.

The TDI technique can also be extended to focal plane arrays with color filter arrays such as the Bayer pattern. In that case, upon each trigger the charge is transferred from the photodiode to the VCCD followed by a shift of two rows. This preserves the spatial orientation, or phase, of the charge from Bayer color filter array in the VCCD, which repeats every two rows, and ensures that charge from the next trigger will be accumulated with the same orientation, as shown in FIG. 3. For other types of filter array, the number of shifts may change based on the number of rows between repetitions of the filter pattern.

Figure 4:
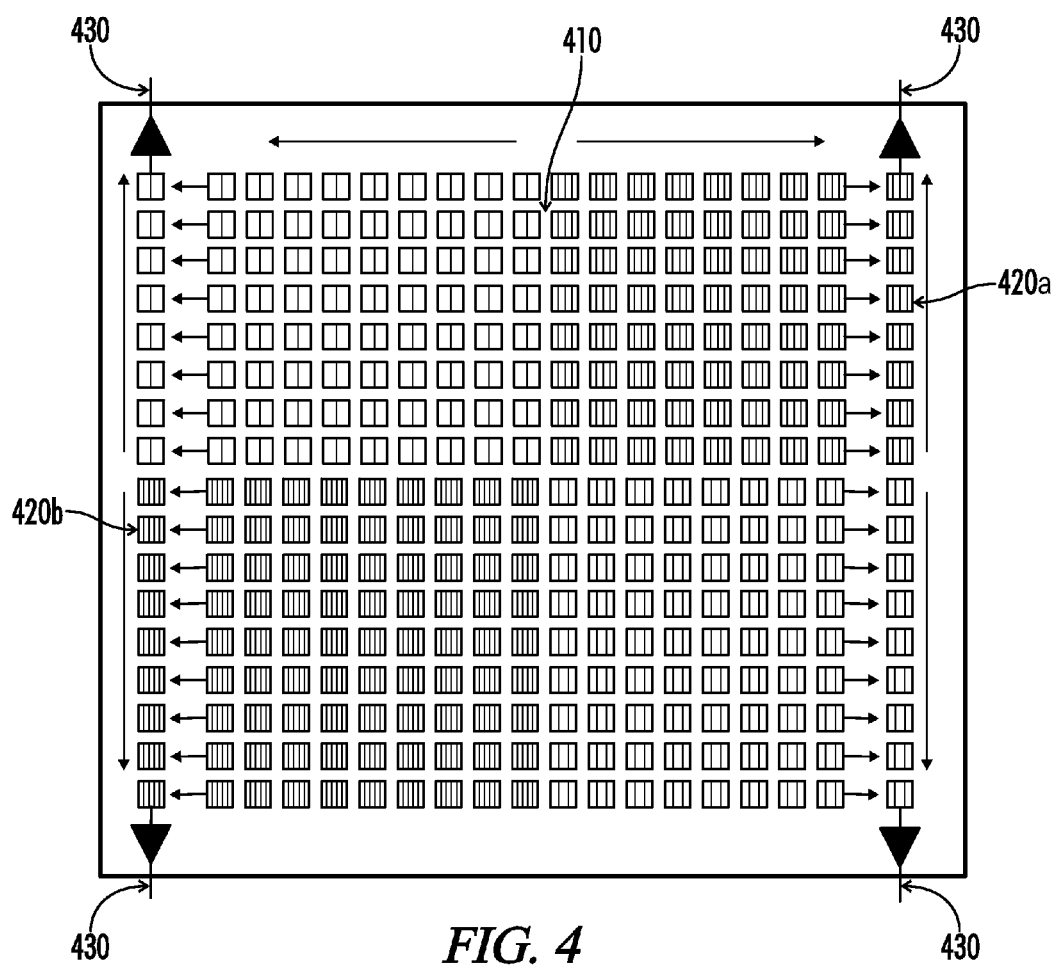
FIG. 4 shows a block diagram of a typical 4-tap CCD.

The technique can be extended, for example, to multi-tap devices in which the charge can be read out of the horizontal CCD (HCCD) in both directions and shifted "left" or "right" in the VCCD, as in some 4 tap devices sold by Truesense Imaging such as the KAI-08050. In the latter case, charge can be accumulated in TDI mode in either direction. Therefore, the TDI mode can follow image motion across the focal plane array in either direction parallel to the VCCD, allowing scanning to take place in both directions and decreasing the time to scan a large area. FIG. 4 is a block diagram of a typical 4-tap CCD. During normal operation, charge is transferred from the pixel array, 410 in two directions simultaneously to the readout registers, 420a and 420b, on either side of the array. This essentially divides the device into 4 quadrants which can be read out simultaneously to the output nodes 430.

Figure 5:
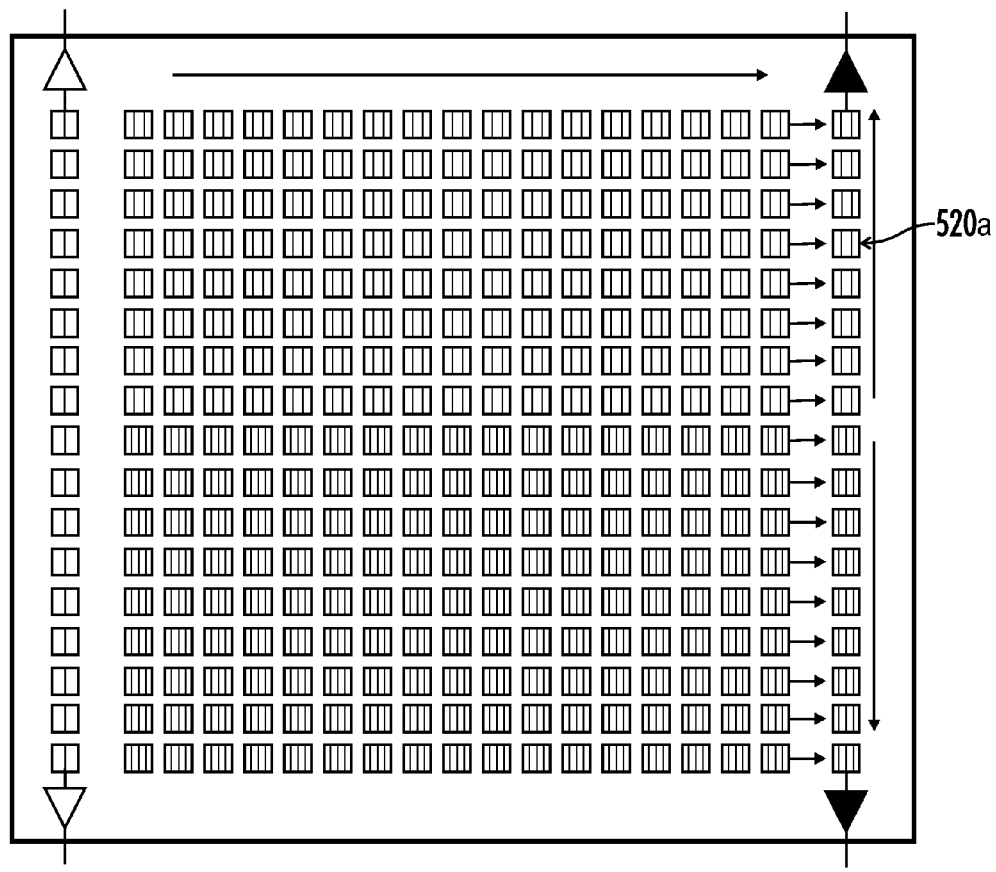
FIG. 5 shows a block diagram of a 4-tap CCD with charge being read out of a right readout register in two directions.
Figure 6:
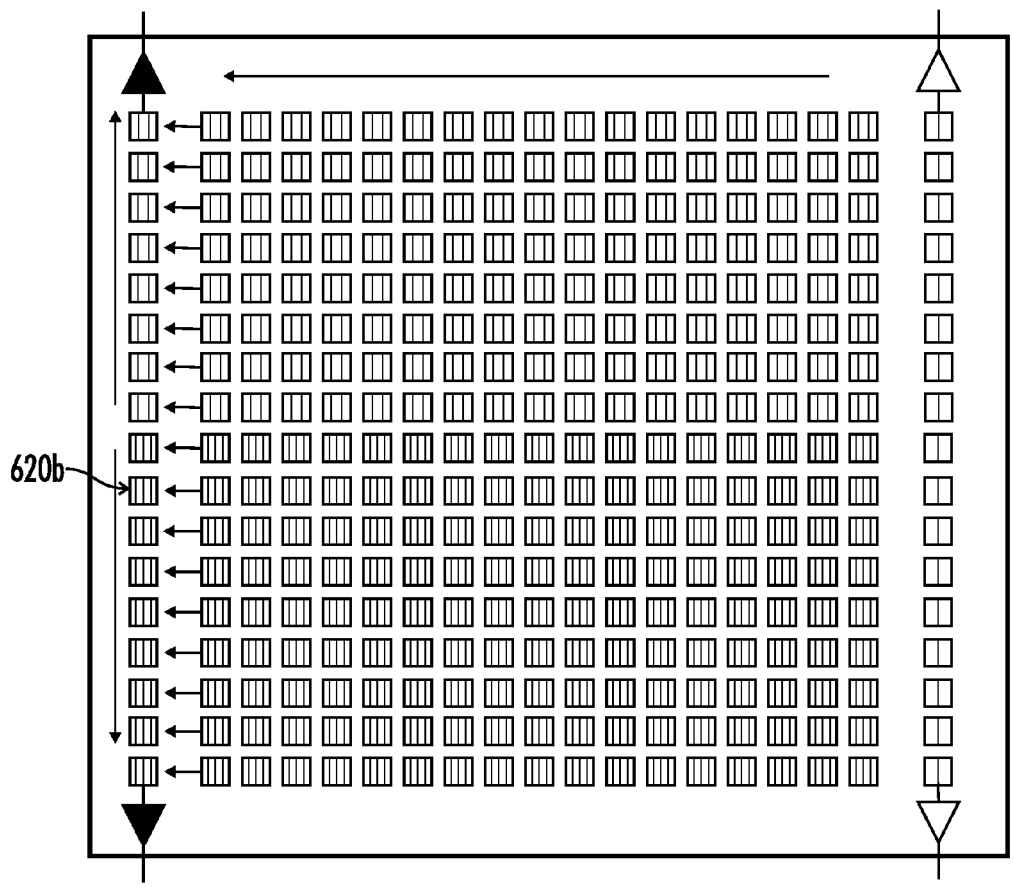
FIG. 6 shows a block diagram of a 4-tap CCD with charge being read out of a left readout register in two directions.

A 4-tap device can also be operated as shown in FIG. 5, in which the charge from the entire array is transferred to the right and read out of the readout register, 520a, in two directions simultaneously. In a similar manner, the charge from the entire array can be transferred to the left and read out of the left readout register, 620b, as in FIG. 6.

Figure 7:
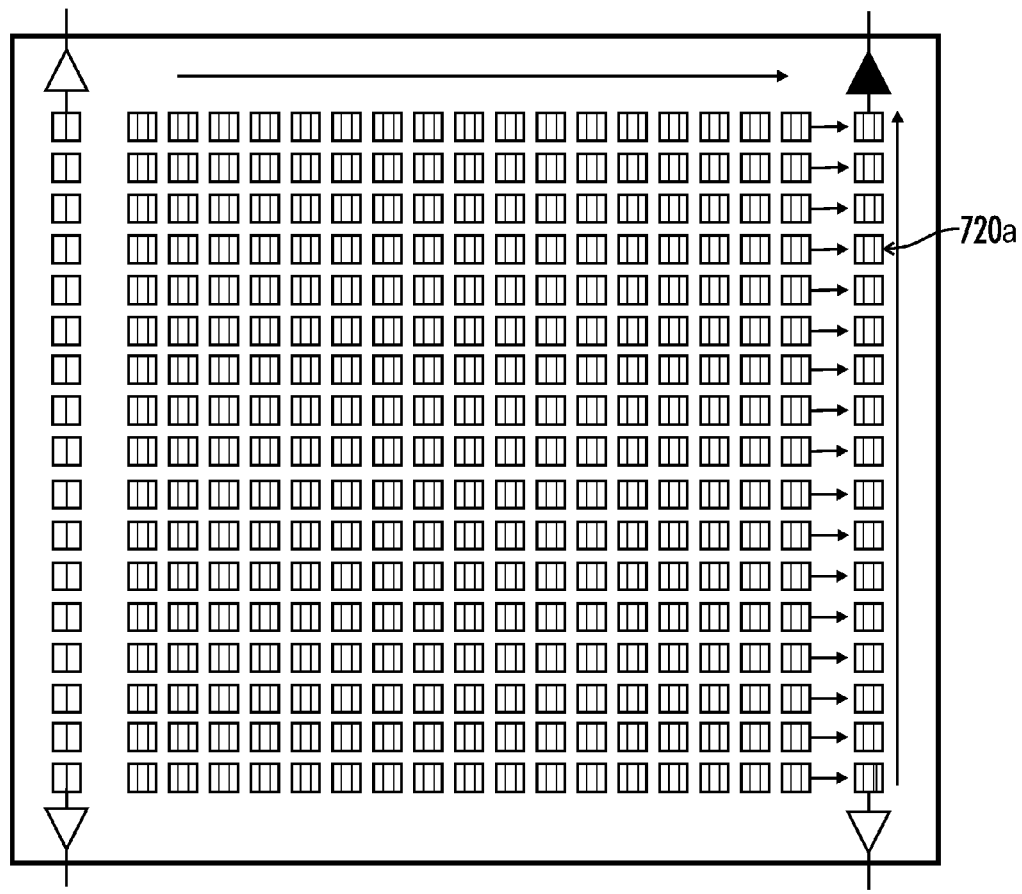
FIG. 7 shows a block diagram of a 4-tap CCD with charge being read out of a right readout register in one direction.
Figure 8:
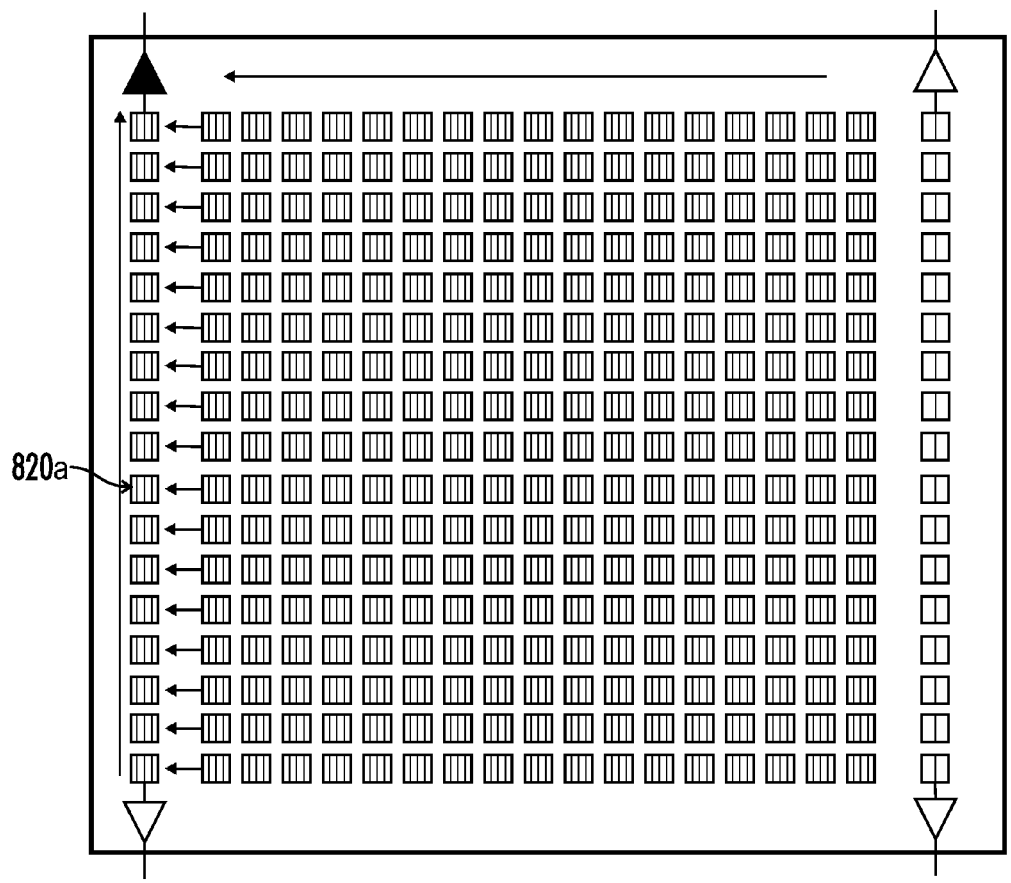
FIG. 8 shows a block diagram of a 4-tap CCD with charge being read out of a left readout register in one direction.
Figure 9:
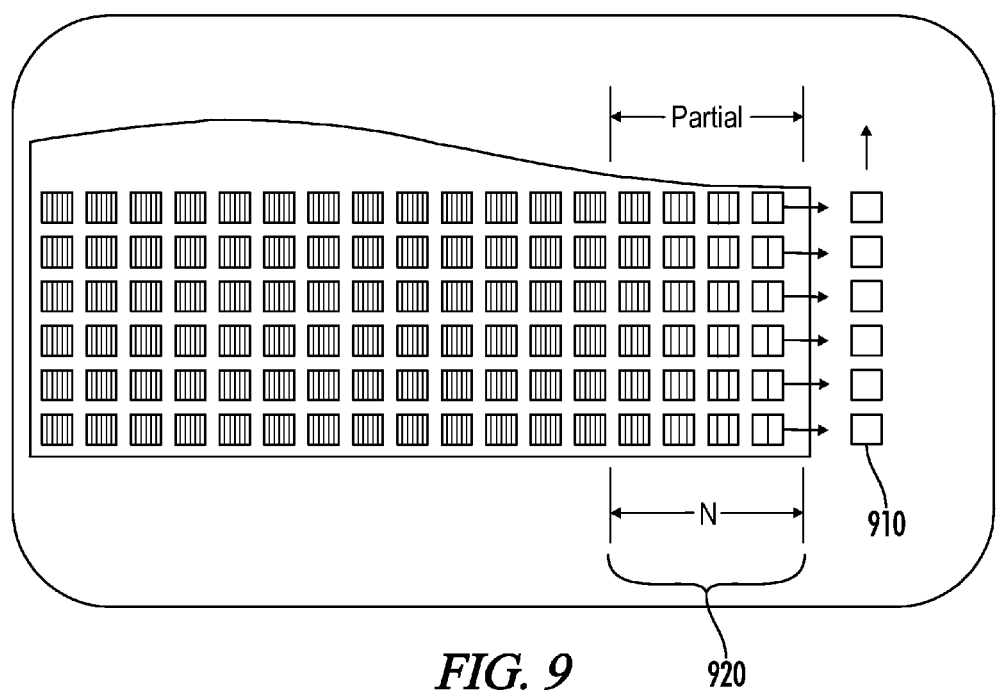
FIG. 9 shows an array ready for resumption of TDI for trailing rows according to an embodiment of the invention.
Figure 10:
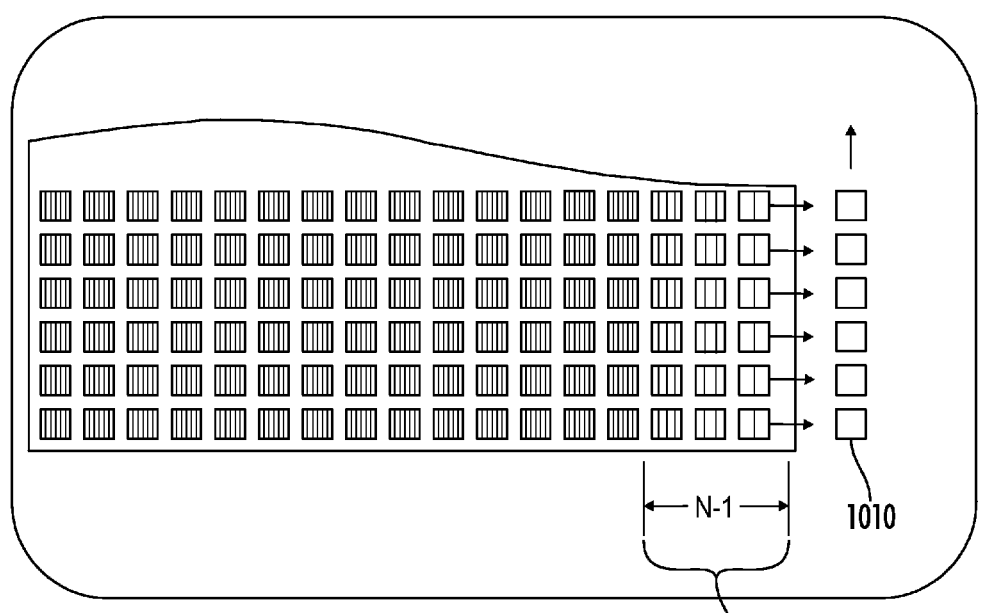
FIG. 10 shows an array after first resumed TDI shift according to an embodiment of the invention.
Figure 11:
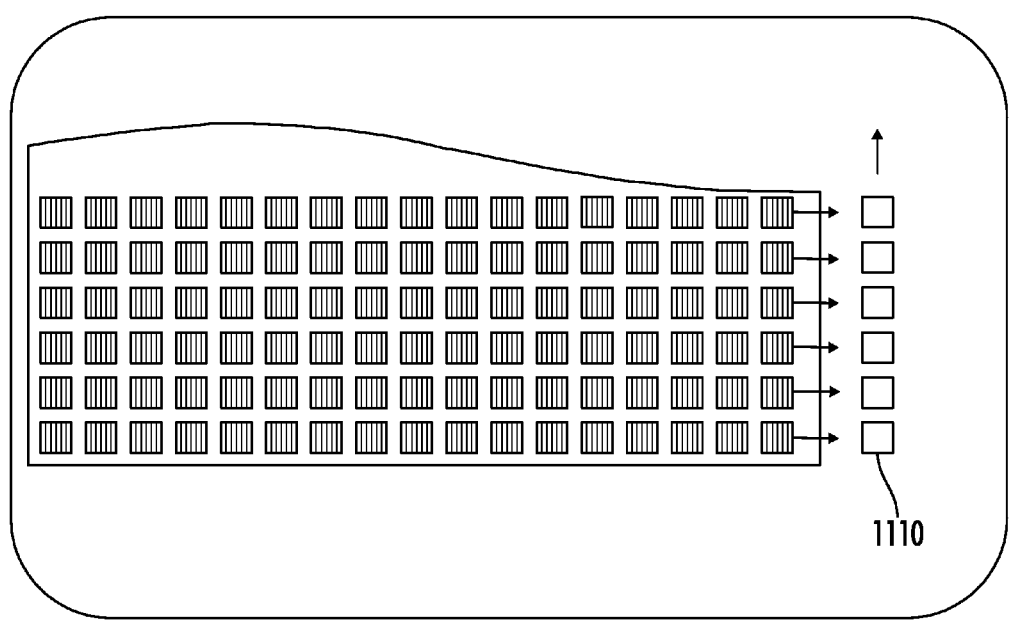
FIG. 11 shows an array after the resumed TDI shift is complete according to an embodiment of the invention.

By applying the TDI method in each direction, bi-directional TDI can be achieved. It should be noted that the split readout registers, used to simultaneously read out the charge from each half or quadrant, increasing the readout rate, are not required. An alternative, bi-directional readout scheme uses only one readout node for each register 720a and 820a, as shown in FIGS. 7 and 8 respectively. This simplifies the electronics required at the expense of maximum readout rate An alternative method preserves the N partially-integrated rows instead of discarding them as follows. After the readout of the leading, valid total_rows-N rows, the N partially integrated rows 920 are positioned at the readout side 910 of the sensor, as described previously and illustrated in FIG. 9. The subject motion is controlled such that at this instant, the registration of the image on the N partially-integrated rows is the same as at the beginning of the TDI sequence for this frame. As the image continues to move, the TDI is resumed on the N partially-integrated rows, and a first TDI shift is executed in response to the motion as before, illustrated in FIG. 10. This shift further integrates the N partially integrated rows, resulting in the complete integration of the leading row and the transfer of that row into the CCD readout register 1010. This row is then read out, with N−1 partially-integrated rows 1020. This process is repeated until the last of the N partially-integrated rows is fully integrated and read 1110, resulting in the integration and readout of the entire device (total_rows), as shown in FIG. 11.

A device to enable the TDI method is described herein. In FIG. 2, a motorized x-y stage 260, such as the Thorlabs MLS203, is mounted to a microscope (not shown for simplicity), and carries a slide 250. A digital camera 230, such as the Thorlabs 1500M-GE with TDI capability, is mounted on the camera port. Encoder pulses from the stage are routed to the stage controller 210, and the encoder pulses are buffered and sent along with necessary communication channel for configuration to the TDI controller 220. The camera 230 and stage controller 210 are connected to a host computer or processor 240, which provides overall system control, acquisition of image data, and user interface. The camera is positioned such that one axis of stage motion is parallel with the direction of TDI charge transfer, and the microscope optics are adjusted in proper fashion to illuminate the slide and focus the magnified image of the slide on the camera focal plane.

The host computer uses the microscope magnification from the object plane to the image plane (typically the magnification of the objective), the number of stage encoder pulses per unit length of stage motion in the direction of motion TDI, and the pixel pitch of the focal plane array to configure the TDI controller 220 to convert encoder pulses to the necessary trigger pulses to initiate a TDI integration sequence in the camera. During the scan process, a series of trigger pulses is generated responsive to the stage movement, and in turn the camera generates a series of TDI integration sequences responsive to the trigger pulses.

Figure 12:
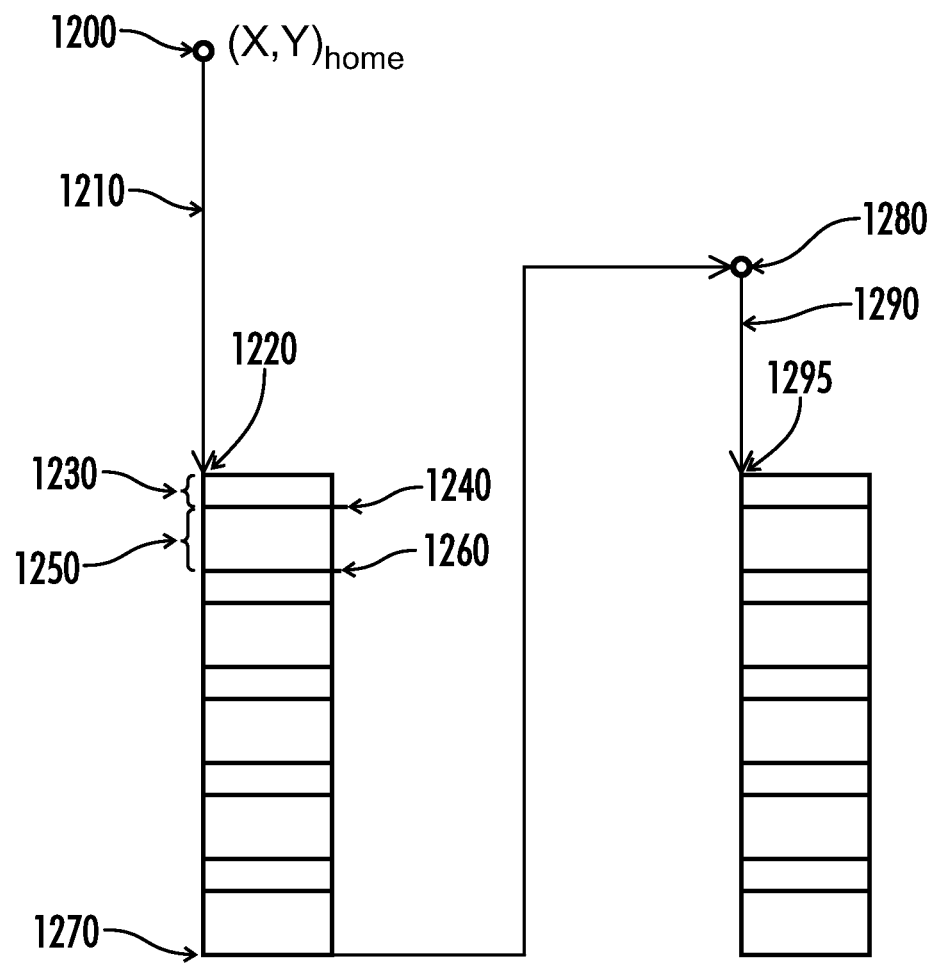
FIG. 12 shows the stage movement and TDI controller process according to an embodiment of the invention.

This process is described in more detail as follows. FIG. 12 illustrates the stage movement and TDI controller process. First, the stage is commanded to move to home position 1200, denoted by (X,Y)home. This home position can be used as an absolute origin from which further absolute positions referenced. The stage accelerates to desired velocity along the acceleration path 1210, before reaching the first frame start position 1220. The TDI controller begins converting decoder pulses to trigger pulses during the TDI integration phase 1230, until N TDI integration sequences have been completed at position 1240. At this point, the TDI controller inhibits further trigger pulses and the camera begins readout of the valid lines. Readout continues through the readout phase 1250, and the stage continues moving. Readout is complete when TOTAL_ROWS-N rows have been read out. The controller is programmed with the absolute positions of all subsequent TDI start positions. When the stage reaches the next TDI start position, 1260, which is guaranteed by the configuration to occur after the readout of the TOTAL_ROWS-N rows is complete, the process repeats. It continues repeating until the stage reaches the absolute position corresponding to the end of the desired scan 1270.

If a larger area is desired, the stage is commanded to the origin of the next acceleration region 1280. The stage accelerates through the acceleration region 1290, and the TDI sequence resumes at the beginning of the new first frame start position 1295. The process repeats as in the first strip, for as many strips as required. The images thus obtained are transferred frame-by-frame to the host computer, where they are stored and displayed for the user.

Figure 13:
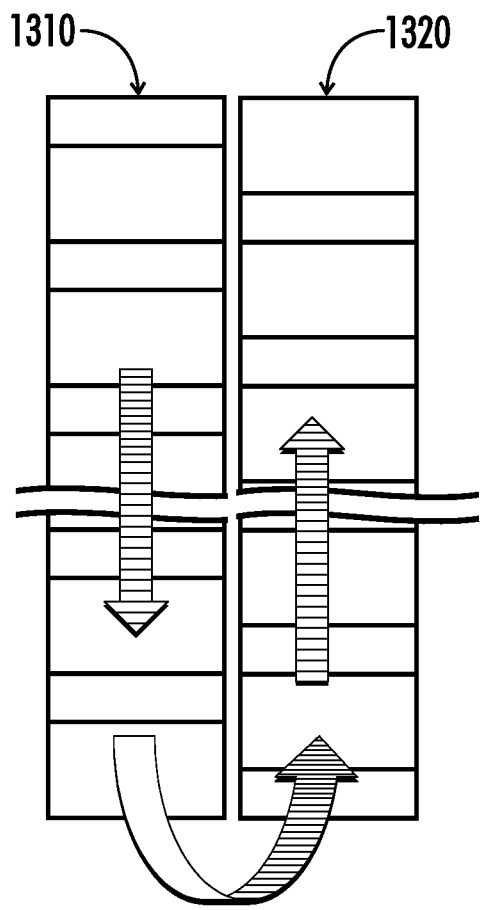
FIG. 13 shows a scan in the forward and backward directions according to an embodiment of the invention.

This process can be made faster by exploiting the multi-tap devices described earlier. Because these devices can shift charge in either direction perpendicular to the rows in the focal plane array as discussed, TDI integration can be carried out in a forward and reverse manner. FIG. 13 illustrates a scan in the forward direction 1310, and reverse direction 1320, eliminating the retrace required when TDI is only unidirectional and thereby decreasing scan time.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for operating a focal plane array in a Time Delay Integration (TDI) mode, the method comprising:
   shifting a number of rows during TDI integration, wherein the number of rows shifted is less than a total number of rows of the focal plane array; and
   reading out a number of rows equal to the total number of rows of the focal plane array minus the number of rows shifted, leaving behind the partially-integrated rows.

2. The method of claim 1, wherein the entire focal plane array is read out and the partially integrated rows are discarded.

3. The method of claim 1, wherein the focal plane array is an interline CCD device.

4. The method of claim 1, wherein an exposure time is less than the readout time of the total number of rows of the focal plane array.

5. The method of claim 1, wherein the shifts can be in a forward or backward direction.

6. A method for operating a focal plane array in a Time Delay Integration (TDI) mode, the method comprising:
   shifting a number of rows during TDI integration, wherein the number of rows shifted is less than a total number of rows of the focal plane array;
   reading out a number of rows equal to the total number of rows of the focal plane array minus the number of rows shifted; and
   resuming the TDI integration on the partially integrated rows and reading out of the partially integrated rows.

7. The method of claim 6, wherein the focal plane array is an interline CCD device.

8. The method of claim 6, wherein an exposure time is less than the readout time of the total number of rows of the focal plane array.

9. The method of claim 6, wherein the shifts can be in a forward or backward direction.

10. A method for operating a focal plane array in a Time Delay Integration (TDI) mode, the method comprising:
    shifting a number of rows of charge in a direction of image motion, wherein the number of rows of charge shifted is less than a total number of rows of the focal plane array; and
    creating a signal that controls a velocity of a moving subject,
    wherein an exposure time is less than the readout time of the total number of rows of the focal plane array.

11. The method of claim 10, wherein the focal plane array is an interline CCD device.

12. The method of claim 10, wherein the shifts can be in a forward or backward direction.

13. A method for operating a focal plane array in a Time Delay Integration (TDI) mode, the method comprising:
    shifting a number of rows of charge in a direction of image motion, wherein the number of rows of charge shifted is less than a total number of rows of the focal plane array; and
    wherein one or more of shift of the charge in the direction of image motion is responsive to a signal derived from a moving subject,
    wherein an exposure time is less than the readout time of the total number of rows of the focal plane array.

14. The method of claim 13, wherein the focal plane array is an interline CCD device.

15. The method of claim 13, wherein the shifts can be in a forward or backward direction.

16. A device for use in performing a Time Delay Integration (TDI) with a focal plane array in which a number of rows shifted during TDI integration is less than a total number of rows of the focal plane array and a number of rows read out equals to the total number of rows of the focal plane array minus the number of rows shifted during TDI integration, leaving behind the partially-integrated rows, the device comprising:
    a processor configured to perform the TDI integration with a trigger;
    an encoder configured to receive information responsive to a motion of an image in a direction of charge transfer and to generate a signal indicating a position of the moving image on the focal plane array;
    wherein the processor is further configured to:
    generate the trigger to initiate the shifts of charge in the focal plane array for the purpose of synchronizing the moving image on the focal plane array to said shifts of charge in the focal plane array; and
    read out data from the focal plane array.

17. The device of claim 16, wherein the device is a separate device within a system.

18. The device of claim 16, wherein the device is embedded in a component of a system.

19. A device for use in performing a Time Delay Integration (TDI) with a focal plane array in which a number of rows shifted during TDI integration is less than a total number of rows of the focal plane array and a number of rows read out equals to the total number of rows of the focal plane array minus the number of rows shifted during TDI integration, and resuming the TDI integration on the partially integrated rows and reading out of the partially integrated rows, the device comprising:
    a processor configured to perform the TDI integration with a trigger;
    an encoder configured to receive information responsive to a motion of an image in a direction of charge transfer and to generate a signal indicating a position of the moving image on the focal plane array;
    wherein the processor is further configured to:
    generate the trigger to initiate the shifts of charge in the focal plane array for the purpose of synchronizing the moving image on the focal plane array to said shifts of charge in the focal plane array; and
    read out data from the focal plane array.

* * * * *